UNITED STATES PATENT OFFICE.

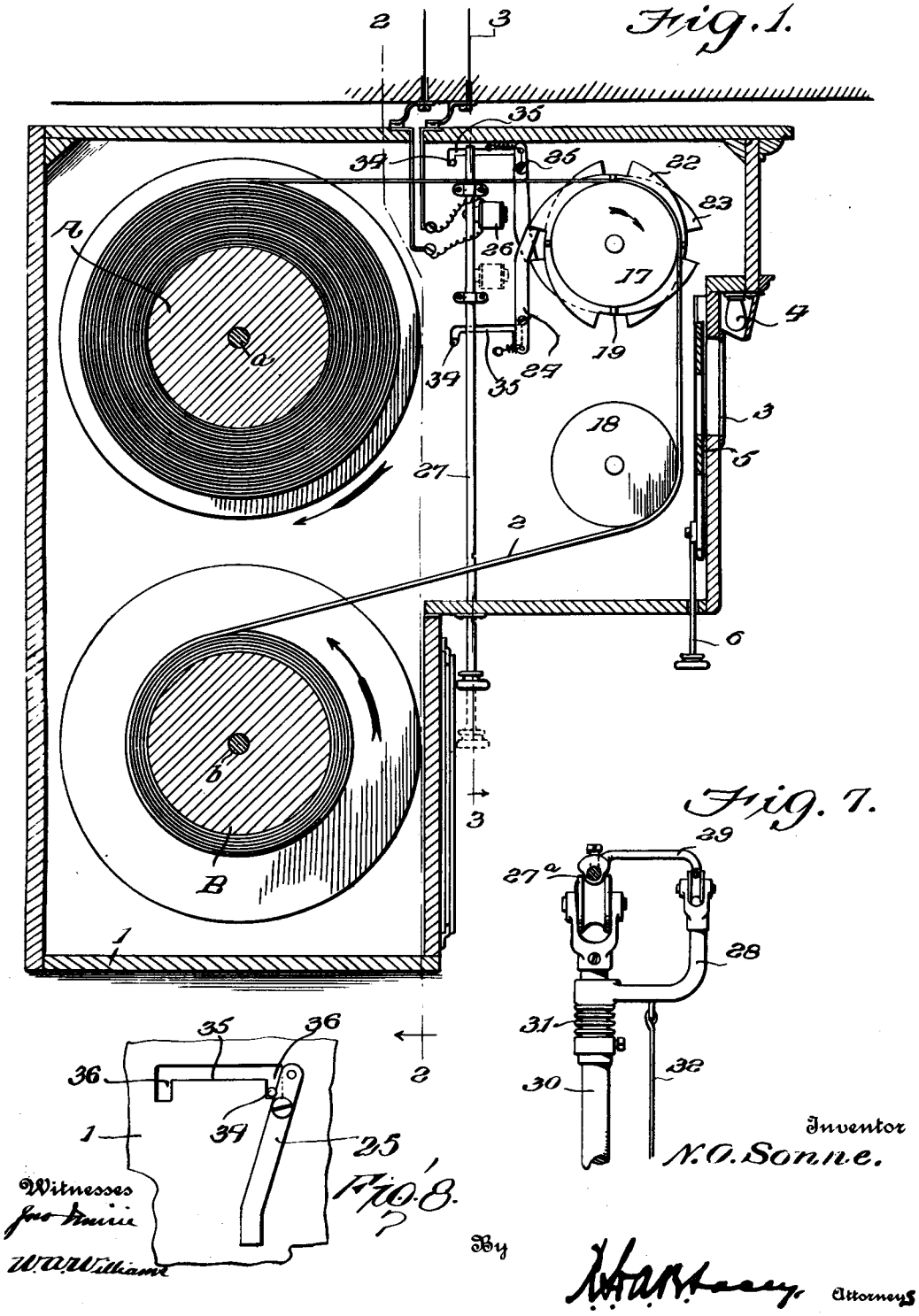

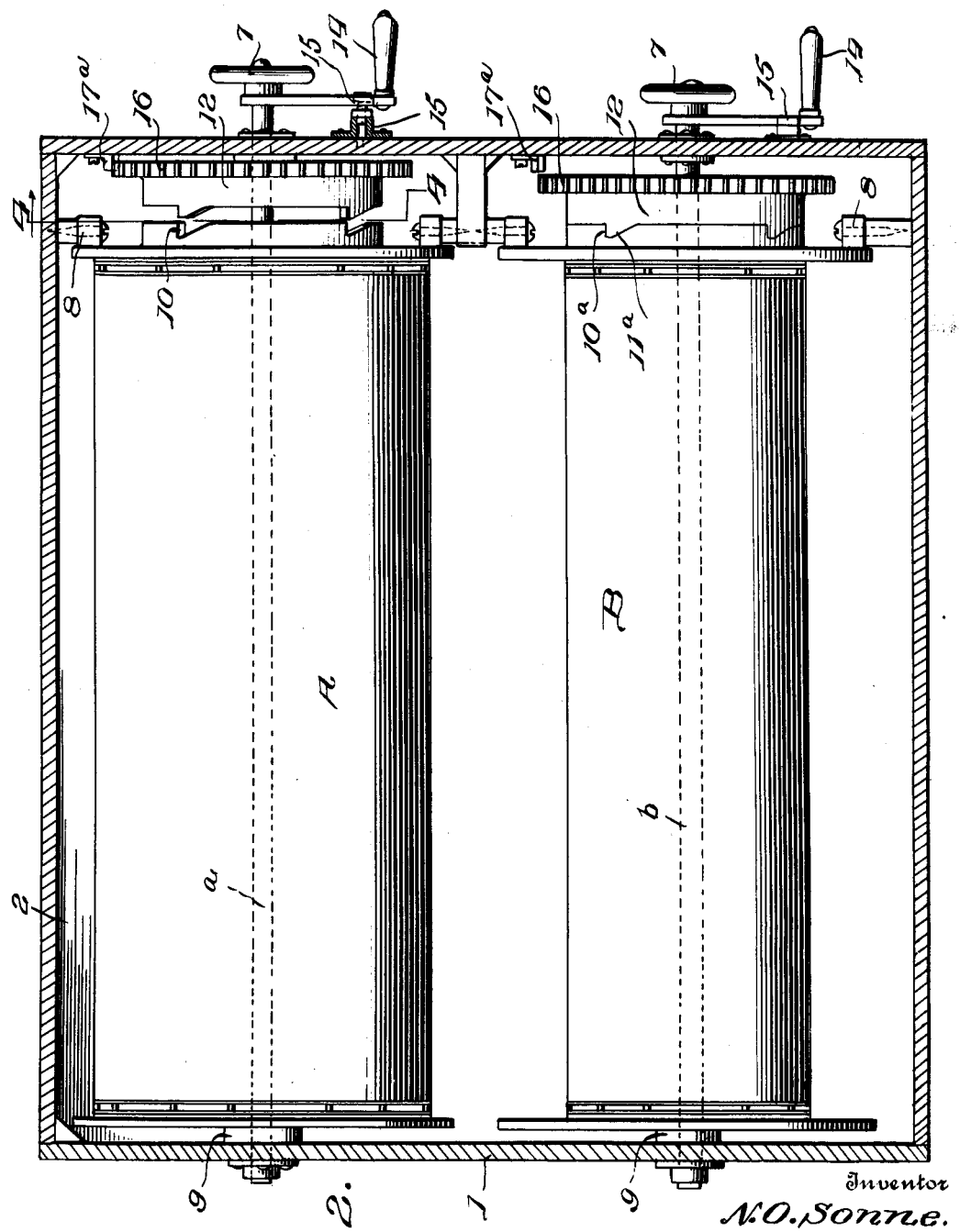

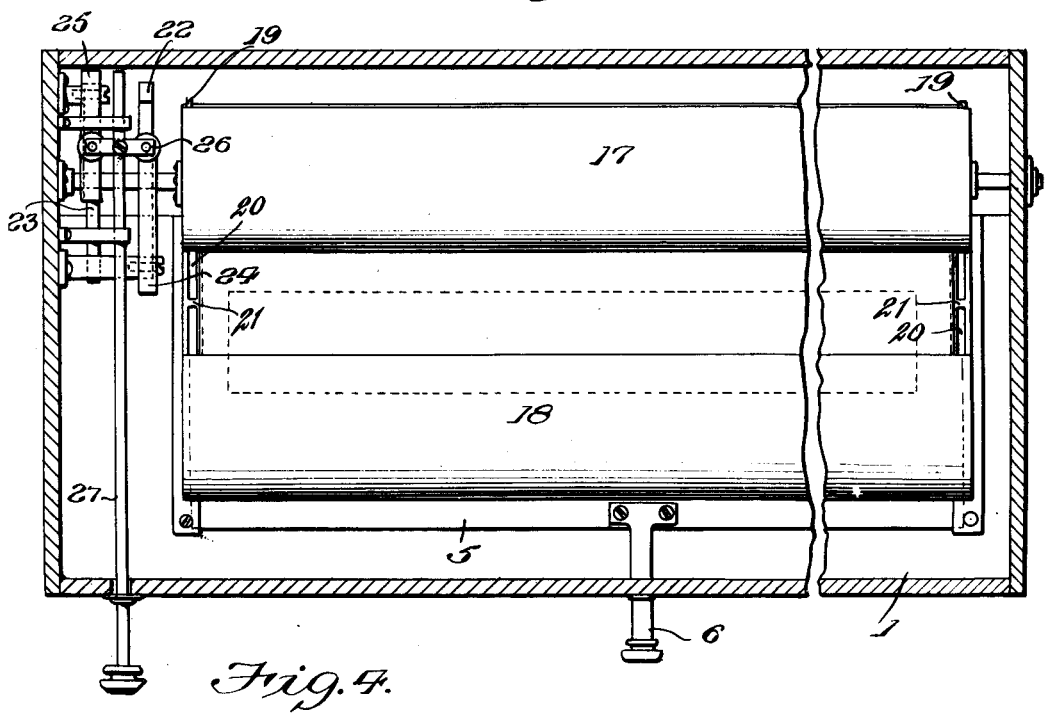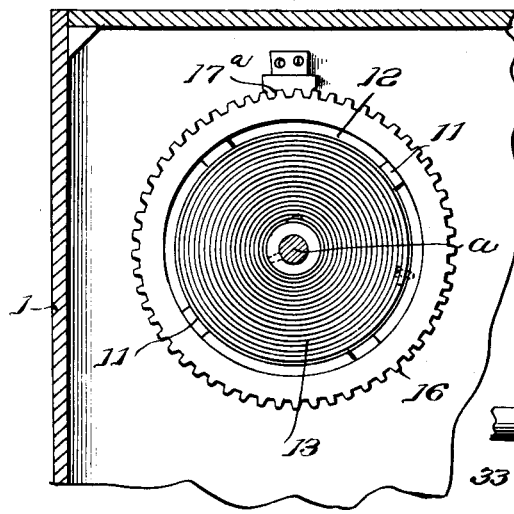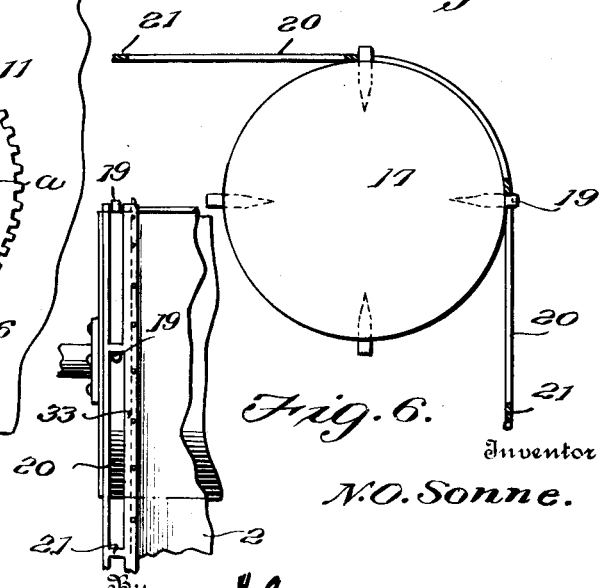

NIELS O. SONNE, OF SHOSHONE, IDAHO.

STATION-INDICATOR.

1,175,482. Specification of Letters Patent. Patented Mar. 14, 1916.

Application filed February 17, 1915. Serial No. 8,819.

*To all whom it may concern:*

Be it known that I, NIELS O. SONNE, a resident of the United States, residing at Shoshone, in the county of Lincoln and State of Idaho, have invented certain new and useful Improvements in Station-Indicators, of which the following is a specification.

The invention has for its object to provide novel means for indicating streets, stations or other points along a prescribed route whereby passengers may be advised in ample time to make provision for leaving the conveyance or provide against passengers being carried beyond a given point.

The invention provides indicating means which are automatically actuated so as to bring the name of the next station or point in position for observation in advance of reaching such station or point, the indicating means being moved in one direction by a constant force, the latter being controlled by restraining means which is tripped at the streets, stations or points to admit of the indicating means moving forward to expose the name of the next street, station or point.

A further purpose of the invention is the provision of a flexible strip, ribbon or fillet containing the names of the streets, stations or points in consecutive order, such strip having its opposite edge portions reinforced, such reinforcements having slots formed therein and the reinforcements being of a nature so as to practically not to stretch whereby the strip may be of textile or other like material.

A further purpose of the invention is the provision of a novel mechanism for controlling the movements of the name strip, such controlling means being tripped at each street, station or point to admit of the name of the next street or station coming into position for observation by the passengers of the conveyance.

The invention also has for its object the provision of novel means for operating the name strip, such operating means embodying a motor spring which is wound and which when wound normally exerts a force to move the name strip, such operating means being governed by the controlling means in the manner hereinbefore stated and subsequently to be pointed out in detail.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings:—Figure 1 is a longitudinal section of a station indicator embodying the invention. Fig. 2 is a section on the line 2—2 of Fig. 1, looking to the left, as indicated by the arrows. Fig. 3 is a section on the line 3—3 of Fig. 1, looking to the right as designated by the arrows. Fig. 4 is a sectional detail on the line 4—4 of Fig. 2, looking to the right. Fig. 5 is a detail view of the drum for controlling the movements of the name strip and showing a portion of such name strip in coöperative relation therewith. Fig. 6 is a detail view in elevation of the parts shown in Fig. 5. Fig. 7 is a detail view of the upper end of the trolley arm showing the means for taking current from the conducting wire for operating the trip whereby the controlling means is released. Fig. 8 is a detail view of one of the dogs showing the same moved to a position to clear the ratchet teeth of the drum.

Corresponding and like parts are referred to in the following description and indicated in all the views of the drawings by the same reference characters.

The operating parts are suitably housed and are arranged within a casing 1. The name strip 2 may be of any length depending upon the number of streets, stations or points to be displayed along the prescribed route of a public conveyance. The casing 1 is provided with an observation opening 3 through which the names of the stations are displayed so as to be read by the passengers. It is to be understood that the device is located in a conspicuous position so as to be seen by all the passengers. In order that the names may be easily read after dark the device is provided with a suitable light as indicated at 4 in Fig. 1. The relative position of the names change with reference to the observation opening 3 according to the direction of movement of the conveyance and in order to provide for such change and yet center the names, a movable frame 5 is provided, the same being arranged opposite the observation opening and made movable to bring the opening therein in position so as to center the names with reference to the exposure thereof. The frame 5 is slidable in suitable guides and is disposed upon the inner side of the front of the casing 1 and is operable by means of a rod 6 which projects through an opening in the casing and is provided at its projecting end with a knob or like part to be gripped when moving the frame.

The two drums A and B are disposed within the casing 1 and are loose upon shafts $a$ and $b$. The name strip 2 is adapted to be wound upon either one of the drums and in operation is unwound from one drum and wound upon the other drum. The drum from which the name strip is unwound is loose whereas the drum upon which the name strip is winding is normally acted upon by means of a motor spring which is intermittently released by the controlling means, thereby admitting of the name strip being moved by stages so as to bring the name of the stations in position for observation as such stations are reached. The shafts $a$ and $b$ are mounted to turn and also have a limited longitudinal movement. The turning of the shafts admits of the winding of the motor springs whereas the longitudinal movement of the shafts admits of throwing the driving means into and out of action. Each of the shafts $a$ and $b$ is provided at one end with a button 7 or like part to be gripped when it is required to move the shaft longitudinally. Each of the drums A and B is flanged at its ends and these flanges engage the edges of the name strips and cause the same to wind evenly. Rollers 8 engage the outer side of one flange or head of the drums and limit the movement in one direction. Washers or bosses 9 engage the opposite ends of the drums and limit and prevent longitudinal movement thereof in the opposite direction. The drum A is provided at one end with teeth 10 which engage teeth 11 of the driving means. The teeth 10 and 11 may be formed in any manner. The drum B is formed with the teeth $10^a$ which are adapted to coöperate with teeth $11^a$ of the driving means. Inasmuch as the driving means, or motive power, is the same for each of the drums a detailed description of one is deemed sufficient for a clear understanding of both.

A barrel 12 is loose upon an end portion of each of the shafts $a$ and $b$ and this barrel is provided at its inner end with the teeth 11 or $11^a$. A motor spring 13 is disposed within each of the barrels and is connected at one end to the shaft $a$ or $b$ and at its opposite end to the barrel. When the spring 13 is wound and the barrel is in clutched engagement with the drum and the shaft is held stationary, the spring tends to rotate the barrel and drum to wind the name strip upon the latter. The spring 13 is of spiral form, such as is commonly employed in spring motors. The spring is wound by holding the barrel stationary and rotating the shaft, the latter being turned by means of a crank 14 which is secured to the shaft. After the spring is wound the crank is held against backward movement by means of a suitable stop 15 which is mounted upon the casing 1. The barrel 12 is adapted to be held from turning by means of cog teeth 16 formed thereon and a toothed stop $17^a$ provided upon the inner side of the casing and secured thereto. The barrel 12 is movable longitudinally with the shaft $a$ or $b$ so as to throw the teeth 11 or $11^a$ into or out of engagement with the teeth 10 or $10^a$ and also to move the teeth 16 in position to engage the teeth of the stop 17 or to clear the teeth of such stop. When the barrel is moved outward upon the shaft $a$ to cause the teeth 11 to clear the teeth 10 the drum A is free to turn upon the shaft $a$. When the barrel is moved inward to bring its teeth into engagement with the teeth of the drum as indicated at $11^a$ and $10^a$ the spring which has been previously wound exerts a constant force to turn the drum B to wind the name strip thereon. This tendency of the spring to constantly turn the drum is governed by the controlling means hereinbefore referred to generally and described in detail hereinafter. The teeth of the barrel 12 engage the teeth of the drum prior to disengagement of the teeth 16 from the teeth of the stop $17^a$, thereby preventing the unwinding of the spring when moving the barrel to throw the driving mechanism into clutched engagement with the drum to be positively rotated to wind the name strip thereon.

Two drums or rollers, 17 and 18, are located in the forward portion of the casing one above and one below the observation opening 3 thereof with their forward sides near the front wall of the casing so as to bring the part of the name strip bearing the exposed name in such close relationship to the observation opening 3 as to admit of its ready reading. These drums 17 and 18 constitute in effect guides for the name strip and one of such drums, furthermore, acts as the controlling means for governing the movements of the name strip.

The drum 17 is provided at opposite ends with a plurality of pins 19. The pins 19 engage slots 20 along the edges of the name strip. The distance between adjacent pins 19 corresponds to a length of a part of the name strip upon which the name of the street, station or other point appears. Cross pieces 21 separate the slots 20 and engage the pins 19. When the name strip is positively moved in one direction the cross pieces 21 engage the pins 19 upon one side and when the name strip is positively moved in the opposite direction the cross pieces 21 engage the pins 19 upon the opposite side. By reason of the thickness of the pins 19 and the width of the cross pieces 21 the name strip is moved to occupy a different position with reference to the drum and the observation opening and this change tends to throw the name above or below the center of the observation opening 3. To allow for such change and insure the centering of the name, in the observation opening, the movable frame 5 is provided in the manner hereinbefore stated. This frame 5 is shifted at each end of the route and when the travel of the name strip is reversed.

The drum 17 is provided with two sets of ratchet teeth 22 and 23, each set of teeth comprising four elements corresponding with the number of pins 19. A dog 24 is arranged to coöperate with the teeth 22 and a dog 25 is provided to coöperate with the teeth 23. The dogs 24 and 25 have an opposite arrangement. The dogs and teeth preclude movement of the drum 17 in either direction but when one of the dogs is tripped the drum is free to rotate in one direction, the other dog riding upon the teeth. For the sake of illustration it is assumed that the driving power is applied to the drum B, the drum A being loose. As indicated by the arrow the drum B is turned in an anticlockwise direction by the driving or motive means, hence tends to unwind the name strip from the drum A which is rotated in a clockwise direction. The name strip passing over the drum 17 tends to rotate such drum in a clockwise direction and this is resisted by means of the dog 25 engaging one of the teeth 23. If the dog 25 be momentarily tripped, that is, moved outward so as to clear the tooth 23 with which it is in engagement, the drum 17 instantly turns to the right, the dog 24 riding on a tooth 22 and the dog 25 engaging the next tooth 23 so as to arrest the movement of the drum 17 when the next name comes in position to be read through the observation opening 3. When the drum B is released and the drum A is coupled to the driving means the name strip is positively moved in an opposite direction, hence the dog 24 acts in the capacity of a detent and the dog 25 rides upon the teeth 23.

The dogs 24 and 25 are adapted to be fixed by any suitable means but it is preferred to actuate the same electrically and for this purpose an electromagnet 26 is provided and disposed to attract one or the other of the dogs when energized. As indicated by the full and dotted lines in Fig. 1, the electromagnet 24 is movable. In the position indicated by the full lines the electromagnet 26 is adapted to attract the dog 25. When moved to the position indicated by dotted lines in Fig. 1 the electromagnet attracts the dog 24 when energized. For convenience a rod 27 is connected to the electromagnet and projects beyond the casing and is adapted to be operated to shift the electromagnet from one position to the other. The electromagnet 26 derives current from the lead wire 27ª by means of a supplemental arm 28 and conductor 29. The supplemental conductor 29 is attached to the main wire 27ª and is extremely short so as to momentarily energize the electromagnet 26 so that the dog will clear the tooth with which it is in engagement and return quickly and engage the next tooth. It is to be understood that the main conductor 27ª is provided with a supplemental conductor 29 for each street, station or point to be indicated along a prescribed route. The supplemental arm 28 is movable upon the main trolley arm 30 and is supported thereon by means of an expansible helical spring 31. A cord 32 extends from the supplemental arm 28 to within convenient reach of the conductor or other attendant so as to be pulled upon to prevent contact of the arm 28 with the conductor 29 when, from any cause, it is desired to prevent operation of the indicator.

In the preferable construction, the name strip 2 is formed of textile and its edge portions are reinforced by metal ribbons or strips 33 which are riveted or otherwise secured thereto. The slots 20 are formed in the metal ribbons 33. The ribbons 33 are practically non-stretchable, hence the cross pieces 21 preserve a uniform distance and at each movement of the drum 17 the name strip moves a uniform distance thereby insuring the proper positioning of the names opposite the observation opening 3.

The invention is applicable to public conveyances of every description which are adapted to travel over a prescribed route, thereby apprising the passengers of the names of the streets, stations or other points in transit. It is proposed to arrange the parts so that the name of the street or station is exposed prior to reaching the same preferably at one station in advance so that the passenger may be advised in time to prepare for a quick departure. When the conveyance is traveling in one direction the drum from which the name strip is unwound is loose upon its shaft whereas the drum upon which the name strip is to be wound is clutched to the shaft and to the motive power. As the stations are reached the controlling means is tripped, thereby releasing the name strip and admitting of a portion being wound upon the motor driven drum a distance to bring the name of the next station in position to be read. The name strip is released by tripping the detent which is effected by means of the electromagnet 26 which as hereinbefore stated is momentarily energized. When the end of the route is reached the parts are reversed by releasing the drum previously clutched to the motor and coupling the motor previously loose to the propelling or driving means. The position of the electromagnet is likewise shifted so as to act upon the pawl which previously was free and to admit of the pawl previously acting as the detent now becoming the free pawl. When the loose drum is coupled to the motive means and the driving drum is released the name strip is moved a distance corresponding to the slot 20, thereby bringing the cross pieces 21 in advance of the pins in position to engage the pins. This results in a relative change in the position of the names and in order that such names may be centered in the observation opening the frame 5 is moved. It may be necessary to set the mechanism to cause proper registry of the names and this may be easily accomplished by manipulating the drums by hand. Before moving the drum it is necessary to disengage one or the other of the dogs 24 or 25 from the ratchet teeth 22 or 23 according to the direction in which it is required to turn the drum. The dog may be disengaged in any manner found most advantageous. As shown a pin 34 is employed. This pin passes through a slot 35 formed in a side of the casing. The slot 35 has notches 36 at its ends for the pin to enter and hold it in the required position. When the pin 34 enters the notch 36 adjacent the dog the latter is moved to throw its end clear of the ratchet teeth so the drum may be moved in the required direction. The preferred form of stop 15 for holding the crank 14 is movable to be thrown into or out of the path of the crank.

Having thus described the invention what is claimed as new is:

1. In station indicating means, a movable name bearing member, two driving means, means for coupling either driving means with the name bearing member for positively moving the same in one direction, and controlling means for governing the movement of the name bearing member in each direction, said controlling means including oppositely acting dogs and coöperating teeth, and a manually shiftable trip mechanism for momentarily actuating a dog to release the driving means which is coupled to the name bearing member.

2. In station indicating means, a movable name bearing member, means for exerting a constant force for moving the name bearing member in one direction or the other, controlling means for arresting the movement of the name bearing member, the same including two sets of oppositely disposed teeth and oppositely disposed dogs coöperating therewith, a movable trip mechanism, manually operable means for shifting the trip mechanism, and means for actuating the trip mechanism in either position for momentarily releasing the dog acting in the capacity of a detent to admit of the forward movement of the name bearing member.

3. In station indicating means, a movable name bearing member, means for constantly exerting a force tending to impart a positive movement to the name bearing member in each direction, means for throwing one of the name bearing member operating means out of action, a drum having positive engagement with the name bearing member, oppositely disposed sets of ratchet teeth connected with the said drum, oppositely arranged pawls in coöperative relation with the ratchet teeth, pawl actuating means, and means for shifting the pawl actuating means into coöperative relation with one or the other of the pawls.

In testimony whereof I affix my signature in presence of two witnesses.

NIELS O. SONNE. [L. S.]

Witnesses:
 FRED M. JOY,
 E. I. WHEELER.